US010888075B2

(12) United States Patent
Hoskins

(10) Patent No.: US 10,888,075 B2
(45) Date of Patent: Jan. 12, 2021

(54) CASTING DEVICE

(71) Applicant: Jeff Hoskins, South Padre Island, TX (US)

(72) Inventor: Jeff Hoskins, South Padre Island, TX (US)

(*) Notice: Subject to any disclaimer, the term of this patent is extended or adjusted under 35 U.S.C. 154(b) by 0 days.

(21) Appl. No.: 15/099,078

(22) Filed: Apr. 14, 2016

(65) Prior Publication Data
US 2017/0295767 A1 Oct. 19, 2017

(51) Int. Cl.
*A01K 91/02* (2006.01)
*A01K 87/04* (2006.01)

(52) U.S. Cl.
CPC .............. *A01K 87/04* (2013.01); *A01K 91/02* (2013.01)

(58) Field of Classification Search
CPC .............................. A01K 87/002; A01K 91/02
USPC ...................................... 43/18.1 HR, 19, 19.2
See application file for complete search history.

(56) References Cited

U.S. PATENT DOCUMENTS

| | | | | |
|---|---|---|---|---|
| 2,180,781 A * | 11/1939 | Taylor | A01K 91/02 124/5 |
| 2,548,102 A * | 4/1951 | Elliott | A01K 91/02 124/35.1 |
| 2,605,569 A * | 8/1952 | Kronhaus | A01K 91/02 124/27 |
| 2,671,289 A * | 3/1954 | McCullough | A01K 91/02 43/19 |
| 2,885,815 A * | 5/1959 | Clagg | A01K 91/02 43/19 |
| 2,932,111 A * | 4/1960 | Kremski | A01K 91/02 43/19 |
| 3,052,055 A * | 9/1962 | Hayward | A01K 91/02 124/5 |
| 3,392,473 A * | 7/1968 | Dietsch | A01K 91/02 124/27 |
| 3,828,459 A * | 8/1974 | Easom | A01K 91/02 124/67 |
| 3,962,813 A * | 6/1976 | Moon | A01K 87/025 43/19 |
| 5,689,909 A * | 11/1997 | Cheney, Jr. | A01K 91/02 43/19 |
| 8,590,204 B1 * | 11/2013 | Al-Mutairi | A01K 91/02 43/19 |
| 2010/0011652 A1 * | 1/2010 | Mohr | A01K 91/02 43/19 |
| 2011/0005120 A1 * | 1/2011 | de Koning | A01K 87/00 43/19 |

* cited by examiner

*Primary Examiner* — David J Parsley
(74) *Attorney, Agent, or Firm* — Boudwin Intellectual Property; Daniel Boudwin

(57) ABSTRACT

A casting device, such as a fishing rod. The present casting device includes a rod, a spool disposed on the rod, a clamp disposed at the distal end of the rod, and a trigger operably connected to the clamp. The rod is configured to support a primary line having a secondary line extending therefrom. The secondary line further includes a stop configured to be gripped by the clamp. When the stop is gripped by the clamp, the primary line is tethered to the distal end of the rod via the secondary line. In one embodiment, the clamp includes a pair of clamp members connected by an articulated, pivotable connection. The casting device allows a user to precisely control the moment at which the primary line is cast because the primary line remains tethered to the rod until the clamp is opened.

17 Claims, 3 Drawing Sheets

CASTING DEVICE

BACKGROUND OF THE INVENTION

The present invention relates to devices configured to cast and reel in a line, e.g. fishing poles. More specifically, the present invention relates devices used to cast a line with increased speed, distance, and efficiency.

Current casting devices, e.g. fishing poles, do not provide users with the desired degree of control over when the line is released when the device is brought forward in a casting motion. Therefore, there is a need in the prior art for a casting device that provides users with the means to precisely control when the line is released during the casting motion.

SUMMARY OF THE INVENTION

In view of the foregoing disadvantages inherent in the known types of casting devices now present in the prior art, the present invention provides a casting device configured to function with a line that can be reversibly tethered to the end of the rod in order to assist in casting the line at the appropriate time. The present casting device includes a rod, a spool disposed on the rod, a clamp disposed at the distal end of the rod, and a trigger operably connected to the clamp. The rod is configured to support a primary line having a secondary line extending therefrom. The secondary line further includes a stop configured to be gripped by the clamp. When the stop is gripped by the clamp, the primary line is tethered to the distal end of the rod via the secondary line. In one embodiment, the clamp includes a pair of clamp members connected by an articulated, pivotable connection. The casting device allows a user to precisely control the moment at which the primary line is cast because the primary line remains tethered to the rod until the clamp is opened.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
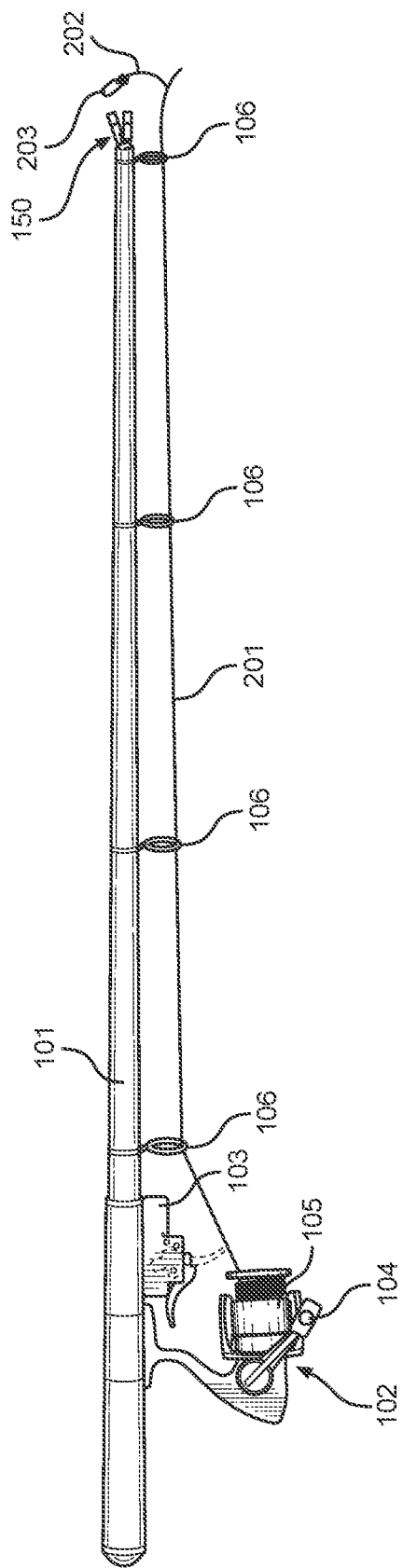
FIG. 1 shows a perspective view of an embodiment of the casting device.

Reference is made herein to the attached drawings. Like reference numerals are used throughout the drawings to depict like or similar elements of the present casting device. The figures are intended for representative purposes only and should not be considered to be limiting in any respect.

An illustrative embodiment of the present invention is herein described as a fishing rod; however, the principles of the illustrative embodiment are equally applicable to devices configured to cast rope, life preservers, or other objects for use by law enforcement personnel, lifeguards, and other such individuals. The embodiment or embodiments of the casting device discussed herein are intended solely to be illustrative.

Figure 2:
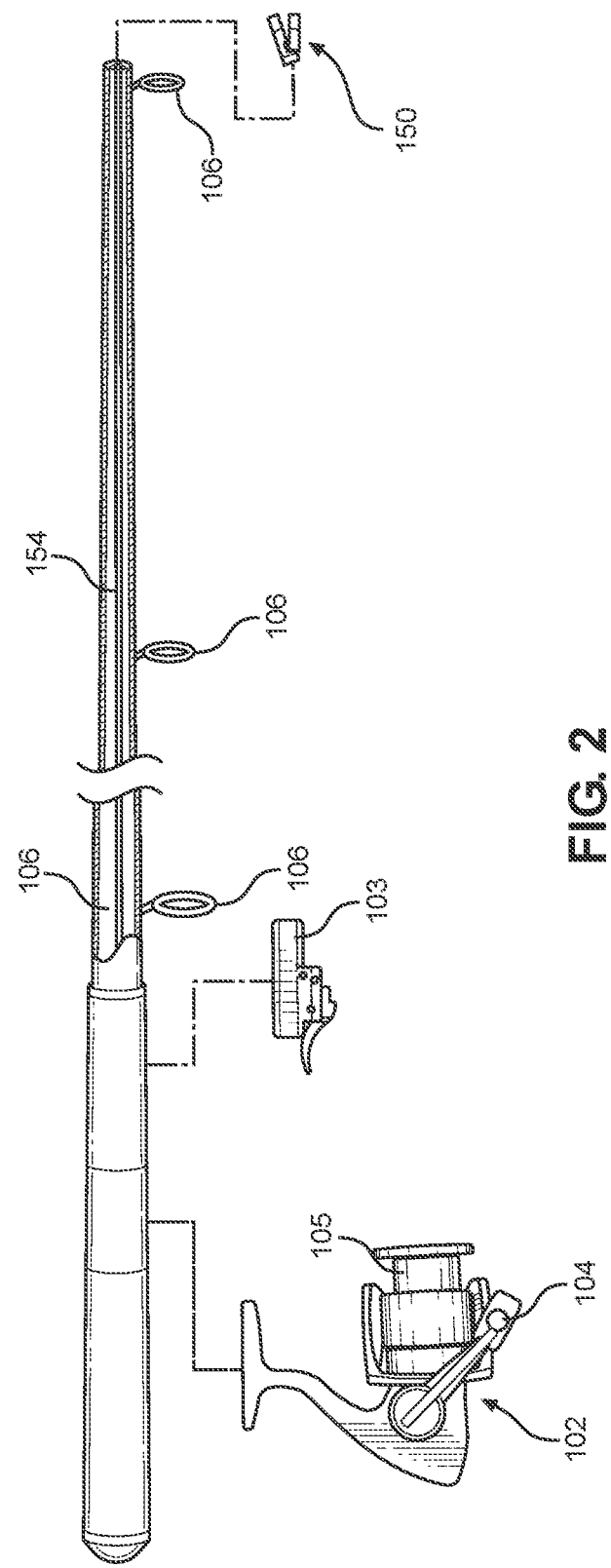
FIG. 2 shows an exploded view of an embodiment of the casting device.

Referring now to FIGS. 1 and 2, there are shown a perspective view and an exploded view of an embodiment of the casting device. The depicted embodiment of the casting device includes an elongated rod 101 supporting a reel 102 and a clamp 150 disposed at the distal end of the rod 101. The reel 102 in the depicted embodiment of the casting device includes at least a spool 105 rotatably controlled by a crank 104. The clamp 150 is operably connected by a cable 154 to a trigger 103 disposed on the rod 101. The trigger 103 can be transitioned between at least a first position in which the cable 154 is held in tension and a second position in which the cable 154 is slack or otherwise not in tension. In an illustrative embodiment of the casting device, the reel 102 includes any fishing reel known in the prior art.

The depicted embodiment of the casting device further includes a line 201 that can be reversibly wound about the spool 105 for casting and reeling in the line 201. The line 201 further includes a secondary line 202 extending therefrom. In an illustrative embodiment of the casting device, the secondary line 202 extends from the line 201 near the distal end thereof. The secondary line 202 further comprises a stop 203 that is configured to be grasped by the clamp 150 and held securely thereby. In an illustrative embodiment of the casting device, the stop 203 is depicted as having a roughly ovoidal shape; however, the stop 203 includes any shape or structure disposed at the end of the secondary line 202 that is configured to be gripped by the clamp 150. When the stop 203 is held by the clamp 150, the line 201 is prevented from being cast when the casting device is brought forward in a casting motion because the line 201 is tethered to the clamp 150 via the secondary line 202. Using the combination of the clamp 150, as controlled by the trigger 103, and the secondary line 202 with the stop 203, a user can thereby control whether the line 201 is cast or not.

In an illustrative embodiment of the present casting device, the rod 101 is constructed from graphite or carbon fiber, fiberglass, bamboo, or any other material known in the prior art for fishing rods. The line 201 is additionally threadable along one or more guides 106 extending along the length of the rod 101. Additionally, in an embodiment of the casting device, the rod 101 tapers in diameter from the end proximal to the reel 102 to the distal end.

The depicted embodiment of the present casting device is a fishing rod having a reel. However, this should not be interpreted as limiting in any way. Alternative embodiments of the present casting device that are intended for use in fishing applications that lack reels, e.g. tenkara-style fishing rods, are contemplated by the present disclosure. Furthermore, embodiments of the present casting device that are utilized for non-fishing applications, such as to a casting device intended to be used to cast life preservers, that lacks reels are also contemplated by the present disclosure.

Figure 3B:
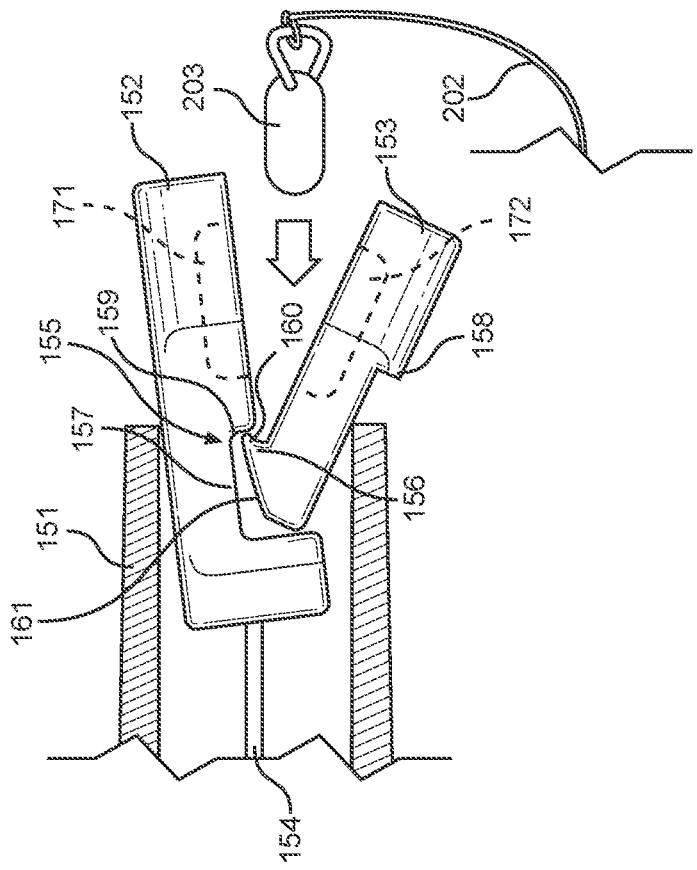
FIG. 3B shows an enlarged cutaway view of the distal end of the casting device with the clamp in an open position.
Figure 3A:
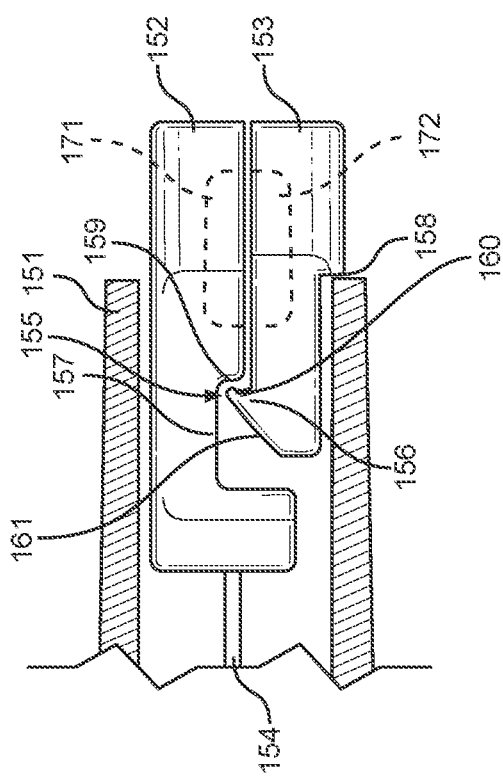
FIG. 3A shows an enlarged cutaway view of the distal end of the casting device with the clamp in a closed position.

Referring now to FIGS. 3A and 3B, there are shown enlarged cutaway views of the distal end of the casting device with the clamp in a closed position and an open position, respectively. In an illustrative embodiment of the casting device, the clamp includes a first clamp member 152 and a second clamp member 153 disposed at the distal end 151 of the rod. A portion of each of the first clamp member 152 and the second clamp member 153 are internal to the distal end 151 of the rod. The first clamp member 152 and the second clamp member 153 are pivotably connected 155, which allows for the clamp to transition between a closed position, as shown in FIG. 3A, and an open position, as shown in FIG. 3B. When in its open position, the clamp is configured to receive the stop 203 at the distal extend of the secondary line 202 extending from the primary line. When in its closed position, the clamp is configured to securely grip or hold the stop 203 in order to hold the primary line tethered to the distal end 151 of the rod via the secondary line 202. Whether the clamp is in a closed position or an open position is controlled by the trigger via a cable 154 that extends from the trigger and is operably connected to the clamp.

In an illustrative embodiment of the clamp, the first clamp member 152 includes a recess 157 configured to receive a flange 156 extending from the second clamp member 153. The flange 156 includes a projection 160 configured to bear against the interior edge 159 of the recess 157 when the clamp is in both its open and closed positions. The projection 160 thereby prevents the second clamp member 153 from disconnecting from the first clamp member 152. The flange 156 further includes an angled surface 161 extending rearward from the projection 160. The angled surface 161 is configured to rest flush against the interior surface of the recess 157 when the clamp is in its open position in order to assist in stabilizing the second clamp member 153 against the first clamp member 152.

In an illustrative embodiment of the clamp, the second clamp member 153 further includes a raised surface or a projection, e.g. a ledge 158 as depicted, disposed on the side of the second clamp member 153 opposite to the flange 156. The ledge 158 is a raised surface configured to bear against the edge of the distal end 151 of the rod and prevent the second clamp member 153 from being drawn therethrough when the clamp is closed.

The clamp is includes a cutout, recess, or other such structure configured to receive and hold the stop 203. In an illustrative embodiment of the clamp, the first clamp member 152 includes a first cutout 171 and the second clamp member 153 includes a second cutout 172. The first cutout 171 and the second cutout 172 are positioned so that they are aligned with each other when the clamp is in its closed position. Furthermore, the first cutout 171 and the second cutout 172 are together dimensioned to be equal to or greater than the dimensions of the stop 203. The first clamp member 152 and the second clamp member 153 rest flush against each other when the clamp is closed, thereby allowing the first cutout 171 and the second cutout 172 to receive and enclose the stop 203 therein.

In an illustrative embodiment of the casting device, the cable 154 is connected to the first clamp member 152. When the trigger is actuated, the cable 154 is tensioned, which in turn causes the cable 154 to exert a longitudinal force on the first clamp member 152. This longitudinal force pulls the first clamp member 152 into the distal end 151 of the rod. When the first clamp member 152 is pulled into the distal end 151 of the rod, the interior edge 159 of the recess 157 bears against the flange 156 of the second clamp member 153, pulling the second clamp member 153 therewith. Further longitudinal movement of the second clamp member 153 is limited by the ledge 158. When the ledge 158 of the second clamp member 153 contacts the distal end 151 of the rod and is prevented from moving further, the first clamp member 152 is likewise prevented from moving further into the rod because the flange 156 bears against the interior edge 159 of the recess 157 and acts as an obstruction to the first clamp member 152. The first clamp member 152 and the second clamp member 153 rest tightly and flushly against each other in the clamp's closed position.

When the trigger is released, the tension in the cable 154 is in turn released, which creates slack in the cable 154. The slack in the cable 154 allows the first and second clamp members 152, 153 a degree of longitudinal movement. When the trigger is released and the casting device is brought forward in a casting motion, the centrifugal force of the casting motion causes the first and second clamp members 152, 153 to move outwardly from the distal end 151 of the rod. The length to which the first clamp member 152 can extend is limited by the ultimate length of the cable 154. The length to which the second clamp member 153 can extend is limited by the projection 160 bearing against the interior edge 159 of the recess 157. The first and second clamp members 152, 153 therefore remain connected despite the tension being removed from the first clamp member 152. The gap between the angled surface 161 and the interior surface of the recess 157 allows the second clamp member 153 to rotate away from the first clamp member 152 into an open position for the clamp. When the second clamp member 153 is rotated fully away from the first clamp member 152, the angled surface 161 rests flush against the interior surface of the recess 157.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A casting device, comprising:
    a rod;
    a trigger disposed on a first end of the rod, adjacent to a reel;
    a clamp disposed at an opposing second end of the rod, the clamp including:
        a first clamp member pivotably engaged with a second clamp member;
    a cable extending from the trigger to the first clamp member;
    the cable movable between a first position and a second position via the trigger;
    wherein the first position is defined where the cable is held in tension, such that the first clamp member and the second clamp member are pressed together;
    wherein the second position is defined where the cable is not in tension, such that the first clamp and the second clamp are separable;
    a line;
    a secondary line extending from the line, the secondary line having a stop; and
    wherein the stop is configured to be gripped by the clamp;

a recess disposed on an outer surface of the first clamp member configured to receive a flange of an outer surface of the second clamp member;

an edge of the first clamp member defining the recess configured to bear against the flange when the clamp is in an open position and thereby longitudinally restricting a movement of the second clamp member.

2. The casting device of claim 1, further comprising:
a gap between an angled surface of the flange and an interior surface of the recess;
the gap configured to allow the second clamp member to rotate relative to the first clamp member.

3. The casting device of claim 2, wherein the angled surface rests flush against the interior surface when the clamp is in the open position.

4. The casting device of claim 1, wherein the edge of the recess bears against the flange when the trigger is actuated, thereby pulling the first clamp member and the second clamp member together into a closed position.

5. The casting device of claim 1, wherein:
the first clamp member comprises a first cutout;
the second clamp member comprises a second cutout;
the first cutout and the second cutout together configured to conform to the stop.

6. The casting device of claim 1, further comprising;
a ledge disposed on the second clamp member;
the ledge configured to bear against the distal end of the rod, longitudinally restricting the movement of the second clamp member.

7. The casting device of claim 1, wherein the first clamp member and the second clamp member rest flush against each other when the clamp is in a closed position.

8. The casting device of claim 1, wherein the clamp further comprises a cutout, the cutout dimensioned to enclose the stop.

9. The casting device of claim 1, wherein:
the first clamp member comprises a first cutout;
the second clamp member comprises a second cutout;
wherein the first cutout and second cutout comprise equal dimensions and together are configured to enclose the entire stop.

10. The casting device of claim 1, wherein the cable extends through a length of an interior of the rod.

11. The casting device of claim 1, wherein the clamp is partially disposed within an interior of the second end of the rod.

12. The casting device of claim 1, wherein the cable exerts a longitudinal force that pulls the first clamp member towards an interior of the rod as the trigger is actuated.

13. The casting device of claim 1, wherein the cable is internally disposed within the rod.

14. The casting device of claim 1, wherein the trigger is disposed on a same side of the rod as the reel.

15. A casting device, comprising:
a rod;
a reel disposed on the rod;
a trigger disposed on a first end of the rod, adjacent to the reel;
a clamp disposed at an opposing second end of the rod, the clamp including a first clamp member and a second clamp member;
the first clamp member operably connected to the trigger via a cable;
the cable movable between a first position and a second position via the trigger;
wherein the first position is defined where the cable is held in tension, such that the first clamp member and the second clamp member are pressed together;
wherein the second position is defined where the cable is not in tension, such that the first clamp and the second clamp are separable;
the first clamp member including a recess disposed on the outer surface of the first clamp member, the recess configured to receive a flange of an outer surface of the second clamp member;
wherein an edge of the first clamp member defining the recess bears against the flange when the clamp is in a closed position;
wherein the edge of the recess restricts a longitudinal movement of the flange when the clamp is in an open position;
the second clamp member including a ledge, the ledge configured to restrict a longitudinal movement of the second clamp member when the clamp is in the closed position;
a gap between the flange and an interior surface of the recess, the gap configured to allow the second clamp member to rotate relative to the second clamp member;
the first clamp member including a first cutout;
the second clamp member including a second cutout;
wherein the first cutout and the second cutout are configured to enclose a stop.

16. The casting device of claim 15, further comprising:
a primary line reversibly windable about the reel;
a secondary line extending from the primary line, the stop disposed at a distal end of the secondary line.

17. The casting device of claim 15, wherein the first clamp member and the second clamp member rest flush against each other when the clamp is in the closed position.

* * * * *